Patented Feb. 25, 1936

2,031,586

UNITED STATES PATENT OFFICE 2,031,586

PROCESS FOR THE MANUFACTURE OF CONDENSATION PRODUCTS

Josef Binapfl and Johannes Kuchenbuch, Krefeld-Uerdingen, Germany, assignors to I. G. Farbenindustrie Aktiengesellschaft, Frankfort-on-the-Main, Germany No Drawing. Application June 30, 1933, Serial No. 678,544. In Germany July 7, 1932

12 Claims. (Cl. 260—2)

The present invention concerns the manufacture of condensation products by causing phenols or derivatives thereof to act on unsaturated fatty acids or derivatives thereof in the presence of boron fluoride, if desired or required while employing a solvent.

In accordance with the invention unsaturated fatty acids, as well as derivatives thereof, for example, esters, primarily the unsaturated higher fatty acids occurring as glycerides in the natural fats and oils, yield novel types of condensation products with phenols and derivatives thereof by the action of boron fluoride. Particularly suitable as starting materials are the drying fatty oils; conversion products of fatty oils, for example, the products known under the name of boiled linseed oils (stand oils), obtainable on polymerization by heating, if desired or required in the presence of a catalyst, can likewise find application.

The reaction proceeds in general most advantageously at room temperature, but higher temperatures can also be restorted to. When selecting the appropriate reaction temperature regard should be had to the fact that at too low a temperature solidification of the reaction mixture or one of the components may take place and consequently the reaction would come to an end, while when employing too high a temperature under certain conditions gelatinization of the fatty acid component might result. We have obtained satisfactory results, for example, within a temperature range from about 10° C. to about 80° C.

In some cases we have found it advantageous to carry out the reaction in the presence of an inert solvent, i. e. a solvent, which does not react under the prevailing conditions. As such solvents hydrocarbons, such as for example, benzine, benzene, toluene, xylene, as well as chloroform, carbon tetrachloride and the like can find application.

The condensation proceeds generally with evolution of heat. The reaction product is distinguished from the oil employed principally by a considerably lower iodine value and when employing free phenols as a rule by a higher acetyl value. Depending on the starting material and the conditions of condensation the condensation product is obtained in the form of a viscous liquid or a pronounced adhesive mass, which can be drawn to threads, or as a rubber-like mass, which dissolves in most of the usual fat solvents.

Among the unsaturated fatty acids or derivatives thereof especially adapted for the new process the fatty acids from olive oil, earthnut oil, cotton seed oil, perilla oil, soya bean oil, linseed oil, China-wood oil, as well as the glycerine esters thereof as such or in the form of the mixtures contained in the natural fats and oils may be mentioned. As phenols and derivatives thereof to be employed phenol, chlorophenols, bromophenols, cresols, xylenols, naphthols and halogen substitution products thereof, as well as phenol ethers and esters, such as for example anisole, phenetol, diphenylether, phenylacetate, cresolpropionate, xylenolbenzoate and the like may be specially referred to.

The following examples will further illustrate the invention:—

Example 1

About 15.5 grams or boron fluoride are introduced in the course of several hours by means of a current of nitrogen and while stirring into a mixture of 300 grams of olive oil (acid value 1.3; saponification value 192.4; acetyl value 18.5; iodine value 91.01) and 150 grams of cresol mixture at room temperature. The mixture becomes colored first blueish green, then deep orange and becomes viscous. The temperature rises to 45° C., after which the reaction mixture is allowed to stand overnight. It is now diluted with 200 grams of benzene and 2 ccs. of water and 25.5 grams of sodium carbonate are introduced in small portions for the purpose of destroying the boron fluoride. After the boron fluoride has thus been destroyed, which can be recognized by a color change of the reaction mixture from a deep orange to a bright yellow, the inorganic constituents are separated by filtration and the benzene and undecomposed cresol are distilled off. The last remaining traces of cresol are distilled from the reaction product at about 250° C. under a pressure of about 18 mms. About 370 grams of a viscous oil are obtained, which does not smell of cresol. The oil possesses the following constants:

Acid value_____ 4.2
Saponification value_____ 159.8
Acetyl value_____ 54.6
Iodine value_____ 55

Example 2

About 18.5 grams of boron fluoride are introduced in the course of 6–7 hours if desired by means of a current of nitrogen and while stirring at room temperature into a mixture of 300 grams of linseed oil for lacquer (acid value 1.7; saponification value 183.8; acetyl value 20; iodine value 170.3) and 150 grams of cresol mixture. Care should be taken by cooling to ensure that the temperature does not rise above 45° C. The mixture slowly becomes viscous and assumes a deep orange red coloration. It is allowed to stand overnight, diluted with 200 grams of benzene and the boron fluoride is decomposed by the addition of 2.5 ccs. of water and 31.5 grams of sodium bicarbonate. After filtering the benzene and cresol are distilled from the mixture as indicated in Example 1. About 405 grams of a very viscous adhesive mass are obtained, which can be drawn to threads and possesses the following constants:—

| | |
|---|---|
| Acid value | 5.7 |
| Saponification value | 150.8 |
| Acetyl value | 56 |
| Iodine value | 72.5 |

*Example 3*

About 25 grams of boron fluoride are introduced with stirring at room temperature in the course of 11 hours into a mixture of 300 grams of oleic acid (acid value 186; saponification value 198.8; acetyl value 5.6; iodine value 83) and 200 grams of commercial cresol. The temperature rises slightly. The reaction mixture, which has assumed a dark brown coloration is then allowed to stand overnight. After diluting with 200 grams of benzene, 3 ccs. of water and 40 grams of sodium bicarbonate are added in order to destroy the boron fluoride. The benzene and cresol are then distilled off at ordinary pressure. Finally the condensation product is heated to about 210° C. under a pressure of 18 mms., when a small quantity of oleic acid distills off. About 365 grams of a viscous oil are obtained, which does not smell of cresol and which possesses the following constants:—

| | |
|---|---|
| Acid value | 93.6 |
| Saponification value | 147.5 |
| Acetyl value | 55 |
| Iodine value | 43.6 |

*Example 4*

About 24 grams of boron fluoride are introduced with stirring in the course of 10 hours into a mixture of 300 grams of technical linseed oil fatty acid (acid value 180; saponification value 215; acetyl value 7; iodine value 162) and 200 grams of cresol. The temperature rises slowly to about 45° C. and is maintained approximately constant by gentle cooling. During the introduction of the boron fluoride the dark brown reaction mixture becomes somewhat more viscous. The working up follows as described in Example 3. About 395 grams of a viscous linseed oil fatty acid-cresol condensation product are obtained, which can be drawn to threads and which does not smell of cresol. The product possesses the following constants:

| | |
|---|---|
| Acid value | 75 |
| Saponification value | 142 |
| Acetyl value | 62 |
| Iodine value | 68 |

*Example 5*

About 18 grams of boron fluoride are introduced in the course of 9 hours with stirring at room temperature into a mixture of 300 grams of linseed oil for lacquer (constants as in Example 2) and 200 grams of anisole. The temperature rises to about 30° C. The mixture is allowed to stand overnight and after diluting with 200 grams of benzene, 2.5 ccs. of water and 30 grams of sodium bicarbonate are added in order to destroy the boron fluoride. The inorganic constituents are then removed by filtration and the working up of the mixture follows as indicated in Example 1. About 350 grams of an oil are obtained, which no longer smells of anisole and which possesses the following constants:—

| | |
|---|---|
| Acid value | 6.5 |
| Saponification value | 175 |
| Acetyl value | 38.5 |
| Iodine value | 109 |
| Methoxyl content | 6.7% |

It may be mentioned that instead of boron fluoride compounds of the same, for example, complex compounds with organic acids, such as formiato-fluoro-boric acid, acetato-fluoro-boric acid, chloroacetato-fluoro-boric acid, lactato-fluoro-boric acid, oleato-fluoro-boric acid, stearato-fluoro-boric acid, can also be employed as the condensing agents in the process of this invention.

We claim:

1. The process which comprises reacting with material selected from the group consisting of phenols, chloro phenols, alkyl phenols, ethers of phenols and esters of phenols with monocarboxylic acids upon material selected from the group consisting of unsaturated fatty acids of fatty oils and natural fats, the glycerine esters thereof, the mixtures of these glycerine esters contained in the fatty oils and natural fats and furthermore stand oils in the presence of boron fluoride.

2. The process which comprises reacting with a phenol upon an unsaturated fatty acid of a fatty oil in the presence of boron fluoride.

3. The process which comprises reacting with linseed oil fatty acid upon cresol in the presence of boron fluoride at a temperature of about 45° C.

4. The process which comprises reacting with a phenol upon an ester of an unsaturated fatty acid of a fatty oil in the presence of boron fluoride.

5. The process which comprises reacting with cresol upon linseed oil in the presence of boron fluoride at a temperature of about 45° C.

6. The process which comprises reacting with a phenol ether upon a glycerine ester of an unsaturated fatty acid of a fatty oil in the presence of boron fluoride.

7. The process which comprises reacting with anisole upon linseed oil in the presence of boron fluoride at a temperature of about 30° C.

8. A condensation product obtainable by reacting with material selected from the group consisting of phenols, chloro phenols, alkyl phenols, ethers of phenols and esters of phenols with monocarboxylic acids upon material selected from the group consisting of unsaturated fatty acids of fatty oils and natural fats, the glycerine esters thereof, the mixtures of these glycerine esters contained in the fatty oils and natural fats and furthermore stand oils in the presence of boron fluoride, said product being distinguished from the starting material of fatty nature employed by a considerably lower iodine value.

9. A condensation product obtainable by reacting with linseed oil fatty acid upon cresol in the presence of boron fluoride at a temperature of about 45° C., said product having an acid value of 75, a saponification value of 142, an acetyl value of 62 and an iodine value of 68.

10. A condensation product obtainable by reacting with cresol upon linseed oil in the presence of boron fluoride at a temperature of about 45° C., said product having an acid value of 5.7, a saponification value of 150.8, an acetyl value of 56 and an iodine value of 72.5.

11. A condensation product obtainable by reacting with a phenol ether upon a glycerine ester of an unsaturated fatty acid of a fatty oil in the presence of boron fluoride, said product being distinguished from the glycerine ester of an unsaturated fatty acid of a fatty oil employed by a considerably lower iodine value.

12. A condensation product obtainable by reacting with anisole upon linseed oil in the presence of boron fluoride at a temperature of about 30°, said product having an acid value of 6.5, a saponification value of 175, an acetyl value of 38.5, an iodine value of 109 and a methoxyl content of 6.7.

JOSEF BINAPFL.
JOHANNES KUCHENBUCH.